(12) United States Patent
Zhao et al.

(10) Patent No.: US 8,766,847 B2
(45) Date of Patent: Jul. 1, 2014

(54) METHOD AND APPARATUS FOR ACQUIRING INFORMATION ABOUT BASE STATION ANTENNA, AND BASE STATION ANTENNA

(71) Applicant: Huawei Technologies Co., Ltd., Shenzhen (CN)

(72) Inventors: Hu Zhao, Shenzhen (CN); Lichang Wu, Shenzhen (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 13/728,051

(22) Filed: Dec. 27, 2012

(65) Prior Publication Data

US 2013/0127657 A1 May 23, 2013

Related U.S. Application Data

(63) Continuation of application No. PCT/CN2012/080400, filed on Aug. 21, 2012.

(30) Foreign Application Priority Data

Nov. 21, 2011 (CN) .......................... 2011 1 0370910

(51) Int. Cl.
*G01S 19/00* (2010.01)
(52) U.S. Cl.
USPC ...................................................... 342/357.2
(58) Field of Classification Search
USPC ...................................................... 342/357.2
See application file for complete search history.

(56) References Cited

U.S. PATENT DOCUMENTS

| | | | |
|---|---|---|---|
| 6,441,779 B1 * | 8/2002 | Bennett et al. | 342/357.36 |
| 7,383,059 B2 * | 6/2008 | Egami et al. | 455/550.1 |
| 2009/0141623 A1 * | 6/2009 | Jung et al. | 370/229 |
| 2011/0090114 A1 * | 4/2011 | Fenton | 342/357.37 |
| 2011/0231061 A1 * | 9/2011 | Reeve et al. | 701/41 |
| 2012/0139325 A1 * | 6/2012 | Norberg et al. | 299/10 |

FOREIGN PATENT DOCUMENTS

| | | |
|---|---|---|
| CN | 2422653 Y | 3/2001 |
| CN | 101398478 A | 4/2009 |
| CN | 101446634 A | 6/2009 |
| CN | 102170321 A | 8/2011 |
| CN | 102509902 A | 6/2012 |
| EP | 1 464 981 A2 | 10/2004 |

OTHER PUBLICATIONS

International Search Report for Application No. PCT/CN2012/080400, mailed on Nov. 22, 2012, 5 pages.
First Office Action received in Chinese Application No. 201110370910.5, mailed Jul. 15, 2013, 9 pages. (Partial Translation).

\* cited by examiner

*Primary Examiner* — Harry Liu
(74) *Attorney, Agent, or Firm* — Slater & Matsil, L.L.P.

(57) ABSTRACT

A method and an apparatus for acquiring information about a base station antenna, and the base station antenna. The apparatus includes at least two receiving antenna units that are configured to receive satellite signals sent by a satellite in a satellite positioning system. The receiving antenna units and the base station antenna accord with a preset position relationship. A processing unit is configured to obtain position information of the receiving antenna units according to the satellite signals and to obtain position information of the base station antenna according to the position information of the receiving antenna units and the preset position relationship between the receiving antenna units and the base station antenna.

18 Claims, 5 Drawing Sheets

METHOD AND APPARATUS FOR ACQUIRING INFORMATION ABOUT BASE STATION ANTENNA, AND BASE STATION ANTENNA

CROSS-REFERENCE TO RELATED APPLICATIONS

This application is a continuation of International Application No. PCT/CN2012/080400, filed on Aug. 21, 2012, which claims priority to Chinese Patent Application No. 201110370910.5, filed on Nov. 21, 2011, both of which are hereby incorporated by reference in their entireties.

TECHNICAL FIELD

Embodiments of the present invention relate to the field of communication technologies, and in particular, to a method and an apparatus for acquiring information about a base station antenna, and the base station antenna.

BACKGROUND

After a base station antenna is deployed, engineering parameter information of the existing antenna, such as geographical location, mounting height, mechanical azimuth, and mechanical downtilt of the base station antenna, is generally collected manually to facilitate maintenance and network optimization of the antenna. Based on the engineering parameter information, operations, such as network management and coverage performance analysis and adjustment, may be implemented.

However, the engineering parameter information of the existing base station antenna is collected by an engineer using an external device on site. The manual collection has disadvantages such as low efficiency, poor real-time performance, high cost, and low accuracy, and the external device being easy to be influenced by factors such as a surrounding magnetic field and an atmospheric environment.

SUMMARY OF THE INVENTION

The objective of the embodiments of the present invention is to provide a method and an apparatus for acquiring information about a base station antenna, and the base station antenna to improve the accuracy and convenience of acquiring information about the base station antenna.

The objective of the embodiments of the present invention is achieved by the following technical solutions.

In one aspect, an embodiment of the present invention provides an apparatus for acquiring information about a base station antenna. At least two receiving antenna units are configured to receive satellite signals sent by a satellite in a satellite positioning system. The receiving antenna units and the base station antenna accord with a preset position relationship. A processing unit is configured to obtain position information of the receiving antenna units according to the satellite signals and to obtain position information of the base station antenna according to the position information of the receiving antenna units and the preset position relationship between the receiving antenna units and the base station antenna.

In another aspect, an embodiment of the present invention provides a method for acquiring information about a base station antenna. Satellite signals sent by a satellite in a satellite positioning system are received through at least two receiving antenna units. The receiving antenna units and the base station antenna accord with a preset position relationship according to the satellite signals. Position information of the receiving antenna units is obtained according to the satellite signs. Position information of the base station antenna according to the position information of the receiving antenna units and the preset position relationship between the receiving antenna units and the base station antenna.

In another aspect, an embodiment of the present invention provides a base station antenna, including the foregoing apparatus for acquiring information about the base station antenna.

It can be seen from the foregoing technical solutions provided in the embodiment of the present invention that information about the base station antenna is acquired through the satellite signals, thereby avoiding disadvantages of an on-site collection by an engineer using an external device, such as low efficiency, poor real-time performance, high cost, and low accuracy, and the external device being easy to be influenced by factors such as a surrounding magnetic field.

BRIEF DESCRIPTION OF THE DRAWINGS

To illustrate the technical solutions in the embodiments of the present invention more clearly, the accompanying drawings required for describing the embodiments are briefly introduced in the following. Apparently, the accompanying drawings in the following description are merely some embodiments of the present invention, and persons of ordinary skill in the art can further derive other drawings according to these accompanying drawings without making creative efforts.

DETAILED DESCRIPTION OF ILLUSTRATIVE EMBODIMENTS

The technical solutions in the embodiments of the present invention are clearly and completely described in the following with reference to the accompanying drawings in the embodiments of the present invention. Apparently, the embodiments in the following description are merely a part rather than all of the embodiments of the present invention. All other embodiments acquired by persons skilled in the art based on the embodiments of the present invention without making creative efforts shall fall within the protection scope of the present invention.

Figure 1:
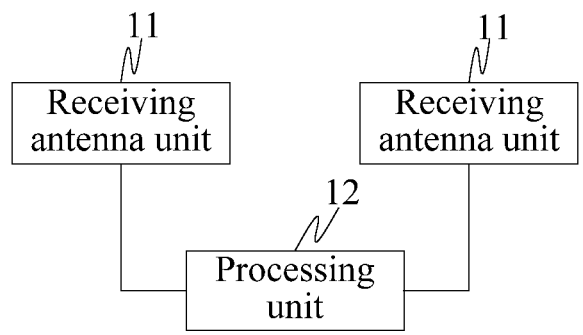
FIG. 1 is a schematic structural diagram of an apparatus for acquiring information about a base station antenna according to an embodiment of the present invention.

As shown in FIG. 1, an apparatus for acquiring information about a base station antenna according to an embodiment of the present invention includes at least two receiving antenna units 11, which are configured to receive satellite signals sent by a satellite in the Global Positioning System GPS. The receiving antenna units and the base station antenna accord with a preset position relationship. A processing unit 12 is configured to obtain position information of the receiving antenna units according to the satellite signals and to obtain position information of the base station antenna according to the position information of the receiving antenna units and the preset position relationship between the receiving antenna units and the base station antenna.

In this embodiment of the present invention, the GPS satellite positioning system is taken as an example for description, but it is not limited to the GPS and can also be another satellite positioning system.

It can be seen from the foregoing technical solutions provided in the embodiment of the present invention, acquiring information about the base station antenna through the satellite signals does not require an on-site collection of information of the base station antenna by an engineer using an external device, thereby avoiding disadvantages of manual collection such as low efficiency, poor real-time performance, high cost, and low accuracy, and the external device being easy to be influenced by factors such as a surrounding magnetic field and an atmospheric environment.

In the apparatus for acquiring information about the base station antenna according to the embodiment of the present invention, the preset position relationship includes: a baseline formed by a connecting line between the receiving antenna units and a normal of the base station antenna have a preset included angle relationship. A preset included angle value includes any angle value ranging from 0 degree to 180 degrees. Preferentially, the preset value may be 90 degrees or 0 degree.

Persons skilled in the art may learn that the normal of the base station antenna is: an intersecting line between the equatorial plane of the antenna and the meridian plane of the antenna, which may be understood with reference to relevant prior art and is not detailed here again.

Optionally, the processing unit 12 may specifically include a first processing subunit, which is configured to obtain carrier phase information carrier wavelength information and satellite ephemeris information of the satellite signals by parsing the satellite signals. A second processing subunit is configured to obtain an azimuth of the baseline and/or a pitch angle of the baseline according to the carrier phase information, the carrier wavelength information, and the satellite ephemeris information and to obtain an azimuth of the base station antenna and/or a downtilt of the base station antenna according to the azimuth of the baseline and/or the pitch angle of the baseline and the preset position relationship.

Persons skilled in the art may learn that the carrier phase information, the carrier wavelength information, and the satellite ephemeris information may be understood with reference to relevant prior art.

Exemplarily, a satellite ephemeris is mainly used for calculating coordinates of a GPS satellite in the World Geodetic System (WGS). The longitude and latitude of the receiving antenna units may be obtained through the satellite ephemeris.

The azimuth of the base station antenna is a clockwise angle from due north to the direction of a main lobe of the base station antenna.

The azimuth of the baseline is an angle centering around an endpoint of the baseline and rotating clockwise from due north to the direction of the baseline.

The downtilt of the base station antenna is a clockwise angle from the horizontal plane to the normal direction of the base station antenna.

The pitch angle of the baseline is a clockwise angle from a ray to the horizontal plane, where the ray is drawn from one receiving antenna unit which is taken as an original point to another receiving antenna unit.

Specifically, in the apparatus for acquiring information about the base station antenna in the embodiment of the present invention, the second processing subunit may be specifically configured to:

obtain, according to the carrier phase information and the carrier wavelength information, wave paths from the GPS satellite to the two receiving antenna units, and obtain a wave path difference between the two receiving antenna units;

obtain, according to the satellite ephemeris information, coordinates of the GPS satellite in the World Geodetic System WGS;

obtain, according to the wave paths from the GPS satellite to the two receiving antenna units, the wave path difference, and the coordinates of the GPS satellite in the World Geodetic System WGS, coordinates of the baseline in the World Geodetic System WGS;

convert the coordinates of the baseline in the World Geodetic System WGS to coordinates in the local level system (LLS, Local Level System); and obtain, according to the coordinates of the baseline in the local level system LLS, the azimuth of the baseline and/or the pitch angle of the baseline.

Persons skilled in the art may learn that the local level system is a topocentric rectangular coordinate system, where its origin overlaps the origin of a carrier coordinate system, X-axis points to the local north meridian line (North), Y-axis is perpendicular to X-axis and points east (East), and Z-axis (Down) is orthogonal to X-axis and Y-axis. Therefore, it is convenient to obtain the azimuth of the baseline and the pitch angle of the baseline through local coordinates of the baseline.

Specifically, in the apparatus for acquiring information about the base station antenna in the embodiment of the present invention, the second processing subunit may further be specifically configured to:

obtain, by subtracting the preset included angle value from the azimuth of the baseline, the azimuth of the base station antenna; and obtain, by subtracting the pitch angle of the baseline from the preset included angle value, the downtilt of the base station antenna.

It can be seen that the azimuth and the pitch angle of the baseline are acquired through the GPS satellite signals, and then the azimuth of the base station antenna and the downtilt of the base station antenna are obtained, thereby avoiding disadvantages of manual collection such as low efficiency, poor real-time performance, high cost, and low accuracy, and the external device being easy to be influenced by factors such as a surrounding magnetic field and an atmospheric environment.

In the apparatus for acquiring information about the base station antenna in the embodiment of the present invention, optionally, the first processing subunit may be further configured to obtain the longitude and latitude information and/or height information of the receiving antenna units by parsing the satellite signals and the second processing subunit may further be configured to obtain the longitude and latitude information and/or height information of the base station antenna according to the longitude and latitude information and/or height information of the receiving antenna units and the preset position relationship.

Specifically, the preset position relationship includes: the receiving antenna units are located in the upper part of the base station antenna, and the height of the base station antenna is the mounting height. The second processing sub-unit may be specifically configured to:

obtain, by dividing the longitude sum of the receiving antenna units by the number of the receiving antenna units, the longitude of the base station antenna; and obtain, by dividing the latitude sum of the receiving antenna units by the number of the receiving antenna units, the latitude of the base station antenna; and obtain, by dividing the height sum of the receiving antenna units by the number of the receiving antenna units, and in combination with the height of the base station antenna, the mounting height of the base station antenna.

Persons skilled in the art may learn that the mounting height of the base station antenna may refer to a height calculated from the center point of the base station antenna, and therefore, the height of the base station antenna needs to be considered.

Optionally, the mounting height of the base station antenna may also refer to a height difference from the center point of the base station antenna to the ground where the base station is located. Therefore, to obtain the mounting height of the base station antenna, the height of the base station antenna and the altitude of the ground where the base station is located need to be considered, that is, the mounting height of the base station antenna is obtained by subtracting the altitude of the ground where the base station is located and the ½ height of the base station antenna from the altitude of the base station antenna.

In the apparatus for acquiring information about the base station antenna in the embodiment of the present invention, optionally, the number of the receiving antenna units may be 3, the position relationship among the 3 receiving antenna units is determined, and the receiving antenna units and the base station antenna accord with a preset position relationship. Exemplarily, a connecting line between each two receiving antenna units forms a baseline, and therefore, three azimuths and three downtilts of the baselines are obtained, and then the azimuth of the base station antenna and the downtilt of the base station antenna are calculated and obtained according to the three azimuths and three downtilts of the baselines.

Persons skilled in the art may understand that when the number of the receiving antenna units is more than 3, the position information of the base station antenna may be acquired with reference to the manner described in this embodiment, which is not detailed here again.

Optionally, the number of GPS satellites for sending satellite signals is at least 2. In this way, the receiving antenna units may calculate the average of the obtained position information of the base station antenna by receiving the satellite signals sent by multiple GPS satellites so as to improve the accuracy of the position information of the base station antenna.

An embodiment of the present invention provides a base station antenna, including the apparatus for acquiring information about the base station antenna in the foregoing embodiment.

The apparatus for acquiring information about the base station antenna may be understood with reference to the apparatus for acquiring information about the base station antenna and its structure in the foregoing embodiment, which is not detailed here again.

Optionally, the apparatus for acquiring information about the base station antenna may be a unit independent of the base station antenna or be integrated with the base station antenna, which is not limited here.

It can be seen from the foregoing technical solutions provided in the embodiment of the present invention, acquiring information about the base station antenna through the satellite signals does not require an on-site collection of information of the base station antenna by an engineer using an external device, thereby avoiding disadvantages of manual collection such as low efficiency, poor real-time performance, high cost, and low accuracy, and the external device being easy to be influenced by factors such as a surrounding magnetic field and an atmospheric environment.

Figure 2:
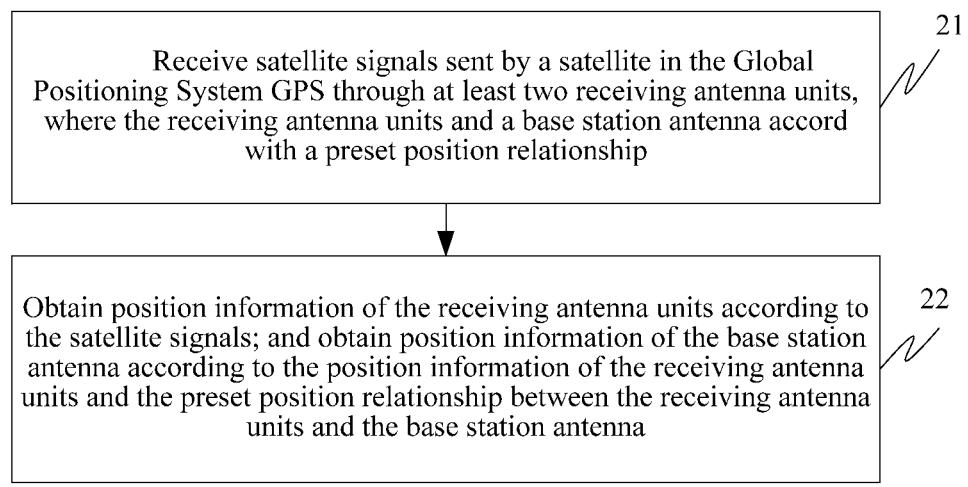
FIG. 2 is a schematic flow chart of a method for acquiring information about a base station antenna according to an embodiment of the present invention.

As shown in FIG. 2, corresponding to the method for acquiring information about the base station antenna in the foregoing embodiment, a method for acquiring information about the base station antenna according to an embodiment of the present invention includes steps as described below.

21: Receive, through at least two receiving antenna units, satellite signals sent by a satellite in the Global Positioning System GPS, where the receiving antenna units and the base station antenna accord with a preset position relationship.

22: Obtain, according to the satellite signals, position information of the receiving antenna units; and obtain, according to the position information of the receiving antenna units and a preset position relationship between the receiving antenna units and the base station antenna, position information of the base station antenna.

In the embodiment of the present invention, the GPS satellite positioning system is taken as an example for description, but it is not limited to the GPS and can also be another satellite positioning system.

It can be seen from the foregoing technical solutions provided in the embodiment of the present invention, acquiring information about the base station antenna through the satellite signals does not require an on-site collection of information of the base station antenna by an engineer using an external device, thereby avoiding disadvantages of manual collection such as low efficiency, poor real-time performance, high cost, and low accuracy, and the external device being easy to be influenced by factors such as a surrounding magnetic field and an atmospheric environment.

In the method for acquiring information about the base station antenna according to the embodiment of the present invention, the preset position relationship includes: a baseline formed by a connecting line between the receiving antenna units and a normal of the base station antenna have a preset included angle relationship. A preset included angle value includes any angle value ranging from 0 degree to 180 degrees. Preferentially, the preset value may be 90 degrees or 0 degree.

Optionally, in the method for acquiring information about the base station antenna in the embodiment of the present invention, the foregoing step 22 may include:

obtain, by parsing the satellite signals, carrier phase information, carrier wavelength information, and satellite ephemeris information of the satellite signals; and obtain, according to the carrier phase information, the carrier wavelength information, and the satellite ephemeris information, the azimuth of the baseline and/or the pitch angle of the baseline; and obtain, according to the azimuth of the baseline and/or the pitch angle of the baseline and the preset position relationship, the azimuth of the base station antenna and/or the downtilt of the base station antenna.

The satellite ephemeris, the normal of the base station antenna, the azimuth of the base station antenna, the azimuth of the baseline, the downtilt of the base station antenna, and the pitch angle of the baseline may be understood with reference to the foregoing embodiment, which is not detailed here again.

Specifically, the obtaining, according to the carrier phase information, the carrier wavelength information, and the satellite ephemeris information, the azimuth of the baseline and/or the pitch angle of the baseline may specifically include:

obtaining, according to the carrier phase information and the carrier wavelength information, the wave paths from the GPS satellite to the two receiving antenna units, and obtaining the wave path difference between the two receiving antenna units;

obtaining, according to the satellite ephemeris information, the coordinates of the GPS satellite in the World Geodetic System WGS;

obtaining, according to the wave paths from the GPS satellite to the two receiving antenna units, the wave path difference, and the coordinates of the GPS satellite in the World Geodetic System WGS, the coordinates of the baseline in the World Geodetic System WGS;

converting the coordinates of the baseline in the World Geodetic System WGS to the coordinates in the local level system LLS; and obtaining, according to the coordinates of the baseline in the local level system LLS, the azimuth of the baseline and/or the pitch angle of the baseline.

Specifically, the obtaining, according to the azimuth of the baseline and/or the pitch angle of the baseline and the preset position relationship, the azimuth of the base station antenna and/or the downtilt of the base station antenna, may specifically include:

obtaining, by subtracting the preset included angle value from the azimuth of the baseline, the azimuth of the base station antenna; and obtaining, by subtracting the pitch angle of the baseline from the preset included angle value, the downtilt of the base station antenna.

Optionally, in the method for acquiring information about the base station antenna in the embodiment of the present invention, the foregoing step 22 may include:

obtaining, by parsing the satellite signals, the longitude and latitude information and/or height information of the receiving antenna units; and obtaining, according to the longitude and latitude information and/or height information of the receiving antenna units and the preset position relationship, the longitude and latitude information and/or height information of the base station antenna.

Specifically, the preset position relationship includes: the receiving antenna units are located in the upper part of the base station antenna, and the height of the base station antenna is the mounting height. The obtaining, according to the longitude and latitude information and/or height information of the receiving antenna units and the preset position relationship, the longitude and latitude information and/or height information of the base station antenna, may include:

obtaining, by dividing the longitude sum of the receiving antenna units by the number of the receiving antenna units, the longitude of the base station antenna; and obtaining, by dividing the latitude sum of the receiving antenna units by the number of the receiving antenna units, the latitude of the base station antenna; and obtaining, by dividing the height sum of the receiving antenna units by the number of the receiving antenna units, and in combination with the height of the base station antenna, the mounting height of the base station antenna.

Optionally, the number of the receiving antenna units may be 3, the position relationship among the 3 receiving antenna units is determined, and the receiving antenna units and the base station antenna accord with a preset position relationship. A connecting line between each two receiving antenna units forms a baseline, and therefore, three azimuths and three downtilts of the baselines are obtained, and then, the azimuth of the base station antenna and the downtilt of the base station antenna are calculated and obtained according to the three azimuths and three downtilts of the baselines.

Optionally, in the method for acquiring information about the base station antenna in the embodiment of the present invention, the number of GPS satellites for sending satellite signals is at least 2. In this way, in step 21, the receiving antenna units may integrate the obtained position information of the base station antenna by receiving satellite signals sent by multiple GPS satellites, thereby increasing the accuracy of the position information of the base station antenna.

An embodiment of the present invention provides an apparatus for acquiring information about a base station antenna to improve the accuracy and efficiency of the engineering parameter measurement of the base station antenna, and to enhance the capacity of a subsequent network management system and a network optimization system to automatically acquire parameters.

Figure 3:
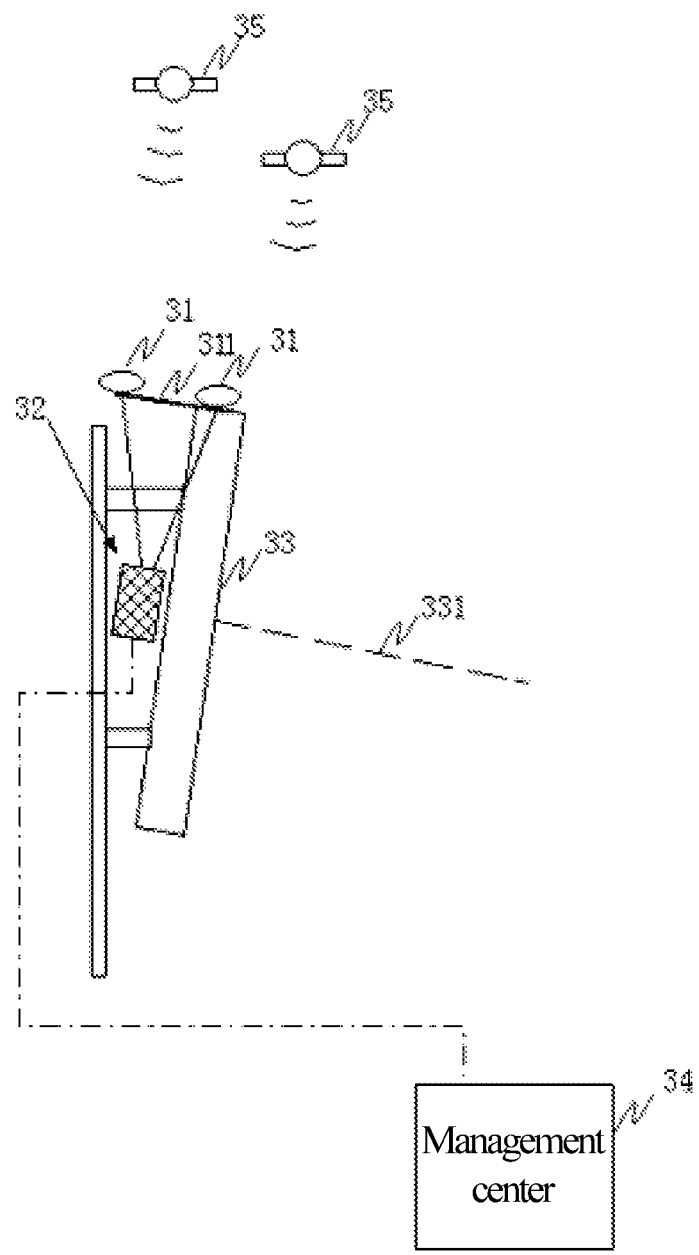
FIG. 3 is a first schematic diagram of application of an apparatus for acquiring information about a base station antenna according to an embodiment of the present invention.

As shown in FIG. 3, two receiving antenna units 31 receive satellite signals of a GPS satellite 35. The two receiving antenna units 31 are connected to a processing unit 32. The processing unit 32 is configured to obtain position information of a base station antenna 33 through the satellite signals. The processing unit 32 is connected to a management center 34 through a transmission channel. The management center 34 is configured to collect and manage the position information of the base station antenna 33 in a centralized way.

An included angle between a connecting line 311 of the two receiving antenna units 31 and a normal 331 of the base station antenna 33 is 0 degree.

The processing unit 32 may directly perform calculations to obtain the final position information according to the satellite signals, and may also obtain, according to the satellite signals, some intermediate data for calculating position information, and transmit the data to the management center 34; and then the management center 34 calculates and obtains the final position information. Optionally, the information obtained by the processing unit 32 through processing may be packed according to specifications as required and then be transmitted to the management center 34.

Through the transmission channel, the management center 34 sends a delivered query command to the processing unit 32, or the processing unit 32 actively uploads the acquired information to the management center 34. Optionally, the transmission channel may be wired, wireless, optical network or any other form of a channel, and the transmission channel may be a private channel, and may also be a shared channel used with other information.

Figure 4:
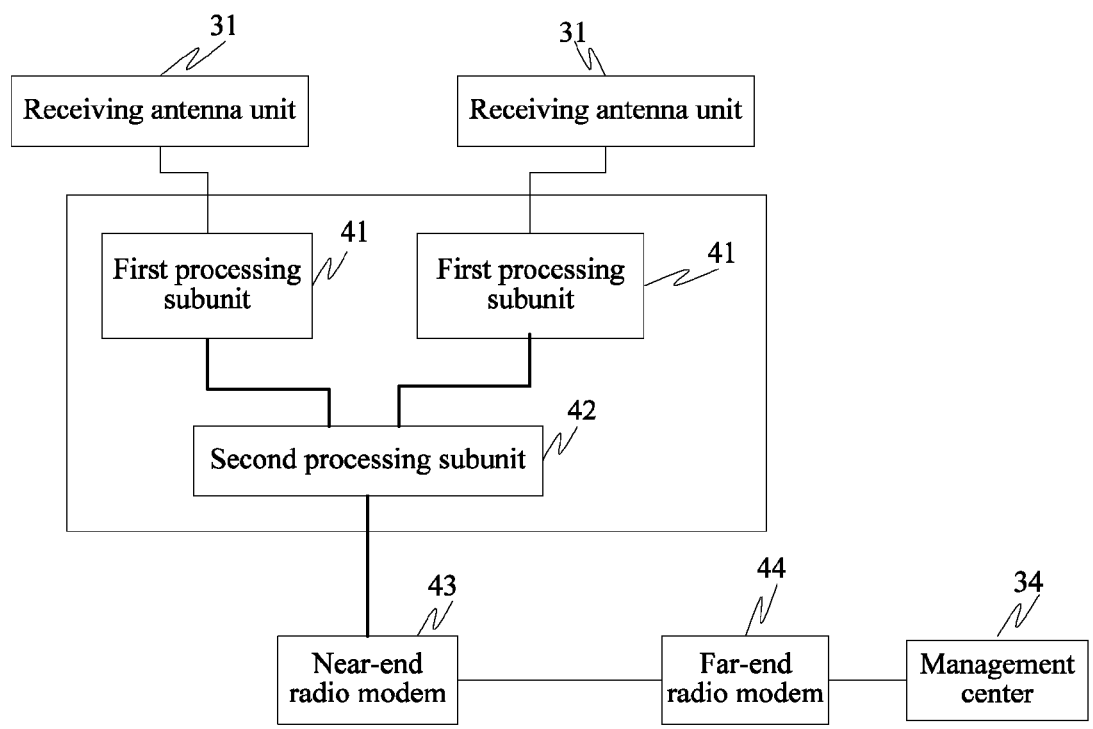
FIG. 4 is a second schematic diagram of application of an apparatus for acquiring information about a base station antenna according to an embodiment of the present invention.

Specifically, as shown in FIG. 4, the processing unit 32 may further include: a first processing subunit 41 and a second processing subunit 42, where the first processing subunit 41 parses the satellite signals of a GPS satellite 35, the second processing subunit 42 processes messages transmitted by the first processing subunit 41, and then the position information of the base station antenna 33 is obtained.

The obtained information processed by the second processing subunit 42 may be transmitted to a near-end radio modem 43, the near-end radio modem 43 may transmit the received information to a far-end radio modem 44 over a wireless network, and then the far-end radio modem 44 transmits the information to the management center 34.

Figure 5:
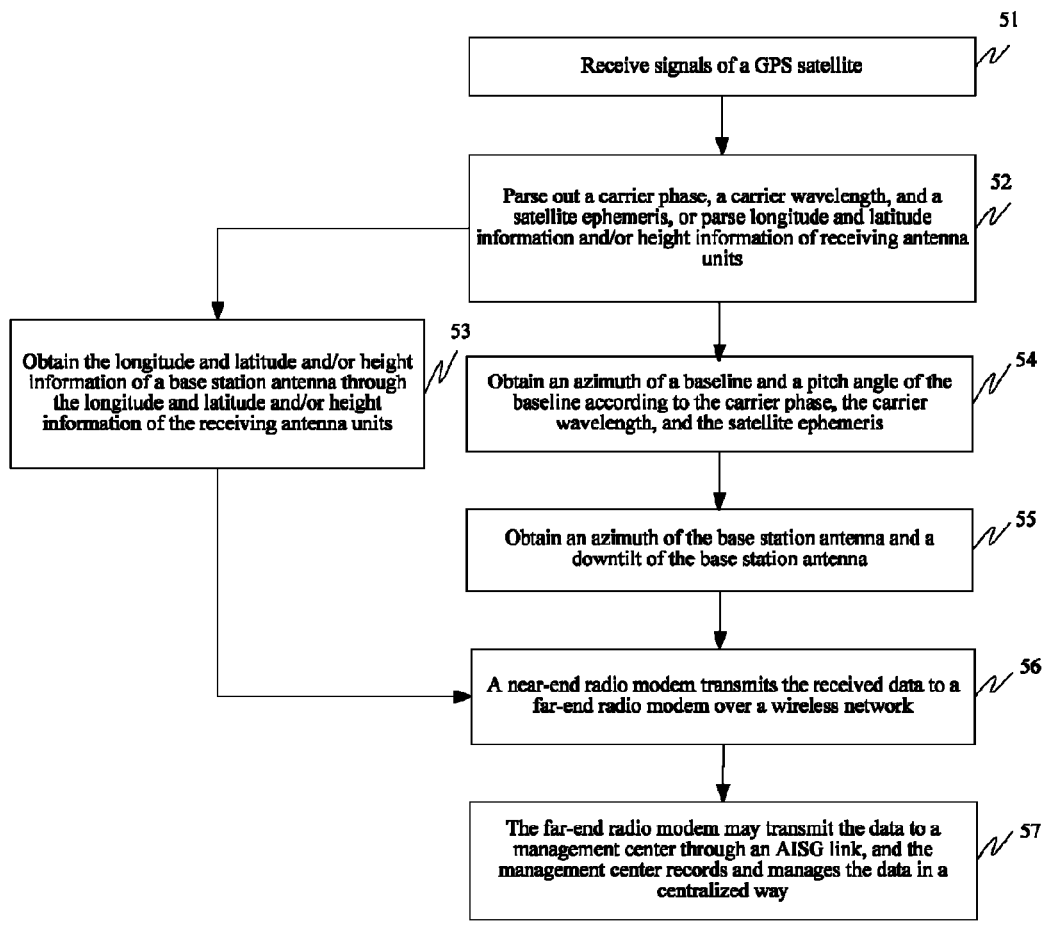
FIG. 5 is a schematic flow chart of application of a method for acquiring information about a base station antenna according to an embodiment of the present invention.

As shown in FIG. 5, a specific process of the acquiring method corresponding to the apparatus for acquiring information about the base station antenna in the embodiment of the present invention is described in detail in the following paragraphs.

Install two receiving antenna units, fix the two receiving antenna units and the base station antenna that needs to be measured by using a mechanical apparatus, for example, setting an included angle between a baseline formed by a connecting line between the two receiving antenna units and a normal of the base station antenna to 0 degree.

51: Receive signals of a GPS satellite.

The two receiving antenna units receive signals of the GPS satellite, and send the signals to the processing unit.

52: The first processing subunit parses the received GPS satellite signals to obtain the longitude and latitude information and/or height information of the receiving antenna units, and sends the information to the second processing subunit. Enter 53.

Or, the first processing subunit parses the received GPS satellite signals to obtain carrier phase information, carrier wavelength information, and satellite ephemeris information which are received by the receiving antenna units, and sends the information to the second processing subunit. Enter 54.

53: The longitude and latitude and/or height information of the base station antenna is obtained according to the longitude and latitude information and/or height information of the receiving antenna units.

The second processing subunit acquires the longitude, latitude, and height information (B1, L1, M1), (B2, L2, M2) of the receiving antenna units, where B represents longitude, L represents latitude, and M represents height.

Meanwhile, referring to FIG. 3, the two receiving antenna units are located in the upper part of the base station antenna. The second processing subunit performs calculations by the longitude, latitude and height information of the two receiving antenna units, to obtain the longitude and latitude of the base station antenna ((B1+B2)/2, (L1+L2)/2), and the mounting height of the base station antenna (M1+M2)/2−h, where h is the ½ height of the base station antenna.

The second processing subunit may further pack and transmit the longitude and latitude and height information of the base station antenna to the near-end radio modem. Enter 56.

54: Obtain the azimuth of the baseline and the pitch angle of a baseline vector according to a carrier phase, a carrier wavelength, and a satellite ephemeris.

Figure 6:
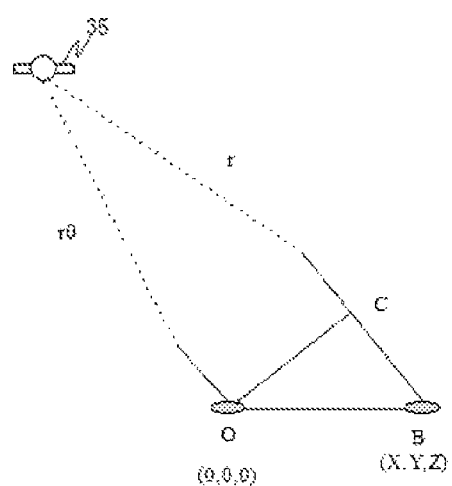
FIG. 6 is a third schematic diagram of application of an apparatus for acquiring information about a base station antenna according to an embodiment of the present invention.

As shown in FIG. 6, O represents one receiving antenna unit, B represents another receiving antenna unit, and then, OB is a baseline (can be understood as a baseline vector), where O point is the origin of coordinates, its coordinates are (0, 0, 0), and coordinates of B are (X, Y, Z).

The wave paths from the GPS satellite to the two receiving antenna units are r0 and r, respectively, and the carrier phase information received by the two receiving antenna units is φo and φB, respectively.

Draw a line perpendicular to the vector r from O point, obtain a point C where the line intersects the vector r, and the wave path difference BC is a projection of the baseline vector OB on the arrival direction of a carrier wave of the GPS satellite signal.

Specifically, obtaining the azimuth of the baseline vector and the pitch angle of the baseline vector may include the following steps.

(1) Through the following formula 1, according to carrier phase information φo and φB, and the carrier wavelength of the GPS satellite signal, wave paths r0 and r from the GPS satellite to the two receiving antenna units are obtained, where the wave paths are distances from the carrier wave of the GPS satellite signal to the receiving antenna units.

$$r0 = \phi o * \lambda, \quad r = \phi B * \lambda \qquad \text{formula 1}$$

where λ is a carrier wavelength of the GPS satellite signal.

(2) Through the following formula 2, according to the wave path difference of the two receiving antenna units, the projection coordinates of the baseline in the World Geodetic System (WGS) are obtained.

$$d = r - r_0 = \qquad \text{formula 2}$$
$$\frac{x_s}{r}X + \frac{y_s}{r}Y + \frac{z_s}{r}Z = \cos\theta * X + \cos\varphi * Y + \cos\psi * Z = e * b$$

where d is the wave path difference of the two receiving antenna units, that is, a difference between distances from the GPS carrier signal to the two receiving antenna units; d consists of several integral number of carrier wave periods and the decimal number of an incomplete carrier wave period; and d=(N+Δ)λ, where λ is a carrier wavelength, N is the integral number of carrier wave periods, and Δ is a residual decimal;

(Xs, Ys, Zs) are coordinates of the GPS satellite in the World Geodetic System (WGS), which can also be represented as $[X_S \ Y_S \ Z_S]_{WGS}$; specifically, the coordinates of the GPS satellite in the World Geodetic System (WGS) may be obtained through the satellite ephemeris;

(X, Y, Z) are the projection coordinates of the baseline in the World Geodetic System (WGS), which can also be represented as $[X \ Y \ Z]_{WGS}$;

$$\frac{x_s}{r}$$

corresponds to cos θ, $$\frac{y_s}{r}$$

corresponds to cos φ, and $$\frac{z_s}{r}$$

corresponds to cos φ;

e is a vector of the receiving antenna units to the direction of the GPS satellite. Because the distance between the two receiving antenna units and the GPS satellite is far greater than the distance between the two receiving antenna units, a vector of any receiving antenna unit of the two receiving antenna units to the direction of the GPS satellite may be considered as the foregoing e; and b is a vector of the baseline in the World Geodetic System (WGS).

It can be seen that the projection coordinates $[X \ Y \ Z]_{WGS}$ of the baseline in the World Geodetic System (WGS) may be calculated and obtained through the foregoing formula 2.

(3) Through the following formula 3, the projection coordinates $[X \ Y \ Z]_{WGS}$ of the baseline vector in the World Geodetic System (WGS) are converted to coordinates $[X \ Y \ Z]_{LLS}$ of the baseline vector in the local level system (LLS, Local Level System).

$$\begin{pmatrix} X \\ Y \\ Z \end{pmatrix}_{LLS} = \begin{bmatrix} -\sin B \cos L & -\sin L & -\cos N \cos L \\ -\sin B \sin L & \cos L & -\cos B \sin L \\ -\cos B & 0 & -\sin B \end{bmatrix} * \begin{pmatrix} \begin{pmatrix} X \\ Y \\ Z \end{pmatrix}_{WGS} - \begin{pmatrix} X_O \\ Y_O \\ Z_O \end{pmatrix}_{WGS} \end{pmatrix} \quad \text{formula 3}$$

where B and L are the longitude and latitude of a receiving antenna unit represented by B, respectively, and the longitude and latitude of the receiving antenna unit may be directly read from the satellite ephemeris.

(4) Because positions of the two receiving antenna units are relatively fixed, that is, coordinate positions of the two receiving antenna units in the carrier coordinate system are determined; the azimuth α of the baseline vector is calculated through the following formula 4.

$$\alpha = -ar\tan\left(\frac{Y_{LLS}}{X_{LLS}}\right) \quad \text{formula 4}$$

Through the following formula 5, the pitch angle β of the baseline vector is calculated.

$$\beta = -ar\tan\left(\frac{Z_{LLS}}{\sqrt{X_{LLS}^2 + Y_{LLS}^2}}\right) \quad \text{formula 5}$$

55: Obtain the azimuth of the base station antenna and the downtilt of the base station antenna.

The second processing subunit calculates the azimuth of the base station antenna through the azimuth α of the baseline vector, the azimuth of the base station antenna=α—an included angle between a baseline formed by a connecting line between the two receiving antenna units and a normal of the base station antenna; that is, the azimuth of the base station antenna=α-0, and the azimuth of the base station antenna=α.

The second processing subunit calculates the downtilt φ of the base station antenna through the pitch angle β of the base vector; that is, the downtilt φ of the base station antenna=the included angle between a baseline formed by a connecting line between the two receiving antenna units and a normal of the base station antenna-β; that is, the downtilt of the base station antenna φ=0-β, and φ=-β.

The second processing subunit may further pack and transmit the data about the azimuth of the base station antenna and the downtilt of the base station antenna to the near-end radio modem through the transmission subunit.

56: The near-end radio modem transmits the received data to the far-end radio modem over a wireless network.

57: The far-end radio modem may transmit the data to the management center through an AISG (Antenna Interface Standards Group, antenna interface standards) link, and the management center records and manages the data in a centralized way.

It can be seen that the apparatus and method for acquiring information about the base station antenna provided in the embodiments of the present invention enables a remote information detection of the base station antenna without accessing a base station, avoiding possible errors which may exist in manual reading and recording of engineering parameters;

data is read in real time, engineering parameters of the antenna may be measured at any time, which provides a basis for network self-optimization.

The measurement accuracy is improved in a complex situation where the measurement is affected by the surrounding environment (for example, a magnetic field and an atmospheric pressure); the accuracy and efficiency of the engineering parameter measurement of the base station antenna is improved, and the capacity of a subsequent network management system and a network optimization system to automatically acquire parameters is enhanced; the antenna engineering parameters are remotely collected and managed in a centralized way, which provides a convenient data interface for applications such as network analysis and network optimization.

Another embodiment of the present invention differs from the foregoing embodiment as follows. The number of receiving antenna units is 3, q position relationship among the receiving antenna units is determined, and the receiving antenna units and a base station antenna accord with a preset position relationship.

A connecting line between each two receiving antenna units forms a baseline, and therefore, three azimuths and three downtilts of the baselines are obtained through the formula 1 to the formula 5 in the foregoing embodiment, and then, the azimuth of the base station antenna and the downtilt of the base station antenna are calculated and obtained according to the three azimuths and three downtilts of the baselines.

Persons skilled in the art may understand that when the number of the receiving antenna units is more than 3, the position information of the base station antenna may be acquired with reference to the manner described in this embodiment, which is not detailed here again.

The difference between another embodiment of the present invention and the foregoing embodiments is that a processing unit includes a first processing subunit and a transmission unit which is connected to the first processing subunit. The first processing subunit parses satellite signals of the GPS satellite to obtain carrier phase information, carrier wavelength information, and satellite ephemeris information, or parses the satellite signals to obtain longitude and latitude and/or height information of receiving antenna units.

The transmission unit transmits the information sent by the first processing subunit to a management center through a near-end radio modem and a far-end radio modem, and the transmission unit can physically be a transmission machine.

The management center performs calculation processing to obtain the longitude and latitude and/or height information of a base station antenna according to the obtained information, or to obtain the azimuth of the base station antenna and the downtilt of the base station antenna, that is, a function of a second processing subunit is performed by the management center. The management center records and manages position information of the base station antenna in a centralized way.

Persons skilled in the art may understand that in the foregoing embodiments, the processing unit can physically be a processor, the processing subunit may be a sub-processor, the receiving antenna units may be a receiving antenna of a satellite positioning system, such as a GPS antenna, and the transmission unit may be a data transceiver, such as a radio modem.

The foregoing descriptions are merely exemplary and specific implementation manners of the present invention, but not intended to limit the protection scope of the present invention. Any variation or replacement that can be easily thought of by persons skilled in the art within the technical scope disclosed in the present invention shall fall within the protection scope of the present invention. Therefore, the protection scope of the present invention shall be subject to the protection scope of the claims.

Persons of ordinary skill in the art should understand that all or a part of the processes of the methods in the embodiments may be implemented by a computer program instructing relevant hardware. The program may be stored in a computer readable storage medium. When the program is executed, the processes of the methods in the embodiments are performed. The storage medium may be a magnetic disk, a compact disk, a read-only memory (Read-Only Memory, ROM), or a random access memory (Random Access Memory, RAM), and so on.

What is claimed is:

1. An apparatus attached to a base station for acquiring information about a base station antenna of the base station, the apparatus comprising:
at least two satellite positioning antennas, configured to receive satellite signals sent by a satellite in a satellite positioning system, wherein a baseline formed by a connecting line between two of the at least two satellite positioning antennas and a normal of the base station antenna have an included angle; and
a processor, configured to obtain carrier phase information, carrier wavelength information and satellite ephemeris information of the satellite signals by parsing the satellite signals, to obtain two wave paths from the satellite to the two of the at least two satellite positioning antennas according to the carrier phase information and the carrier wavelength information; to obtain a wave path difference between the two wave paths; to obtain coordinates of the satellite in a World Geodetic System (WGS) according to the satellite ephemeris information; to obtain coordinates of the baseline in the WGS according to the two wave paths, the wave path difference and the coordinates of the satellite in the WGS; to convert the coordinates of the baseline in the WGS to coordinates in a local level system (LLS); to obtain a pitch angle of the baseline according to the coordinates of the baseline in the LLS; and to obtain a downtilt of the base station antenna according to the pitch angle of the baseline and the included angle.

2. The apparatus according to claim 1, wherein the processor is further configured to:
obtain longitude and latitude information of the at least two satellite positioning antennas by parsing the satellite signals;
obtain a longitude of the base station antenna by dividing a longitude sum of the at least two satellite positioning antennas by the number of the at least two satellite positioning antennas; and
obtain a latitude of the base station antenna by dividing a latitude sum of the at least two satellite positioning antennas by the number of the at least two satellite positioning antennas.

3. The apparatus according to claim 1, wherein the satellite positioning system is a Global Positioning System (GPS).

4. The apparatus according to claim 1, wherein the at least two satellite positioning antennas are located in an upper part of the base station antenna.

5. The apparatus according to claim 4, wherein the processor is further configured to obtain height information of the at least two satellite positioning antennas by parsing the satellite signals; and to obtain a mounting height of the base station antenna on the base station by dividing a height sum of the at least two satellite positioning antennas by the number of the at least two satellite positioning antennas.

6. The apparatus according to claim 1, wherein the processor is further configured to obtain an azimuth of the baseline according to the coordinates of the baseline in the LLS and to obtain an azimuth of the base station antenna according to the included angle and the azimuth of the baseline.

7. A base station, comprising:
a base station antenna;
at least two satellite positioning antennas; and
a processor;
wherein the at least two satellite positioning antennas are configured to receive satellite signals sent by a satellite in a satellite positioning system, wherein a baseline formed by a connecting line between two of the at least two satellite positioning antennas and a normal of the base station antenna have an included angle; and
wherein the processor is configured to:
obtain carrier phase information, carrier wavelength information and satellite ephemeris information of the satellite signals by parsing the satellite signals;
obtain two wave paths from the satellite to the two of the at least two satellite positioning antennas according to the carrier phase information and the carrier wavelength information;
obtain a wave path difference between the two wave paths;
obtain coordinates of the satellite in a World Geodetic System (WGS) according to the satellite ephemeris information;
obtain coordinates of the baseline in the WGS according to the two wave paths, the wave path difference and the coordinates of the satellite in the WGS;
convert the coordinates of the baseline in the WGS to coordinates in a local level system (LLS);
obtain a pitch angle of the baseline according to the coordinates of the baseline in the LLS; and
obtain a downtilt of the base station antenna according to the pitch angle of the baseline and the included angle.

8. The base station according to claim 7, wherein the processor is further configured to:
obtain longitude and latitude information of the at least two satellite positioning antennas by parsing the satellite signals;
obtain a longitude of the base station antenna by dividing a longitude sum of the at least two satellite positioning antennas by the number of the at least two satellite positioning antennas; and
obtain a latitude of the base station antenna by dividing a latitude sum of the at least two satellite positioning antennas by the number of the at least two satellite positioning antennas.

9. The base station according to claim 7, wherein the satellite positioning system is a Global Positioning System (GPS).

10. The base station according to claim 7, wherein the at least two satellite positioning antennas are located in an upper part of the base station antenna.

11. The base station according to claim 10, wherein the processor is further configured to obtain height information of the at least two satellite positioning antennas by parsing the satellite signals; and to obtain a mounting height of the base station antenna on the base station by dividing a height sum of the at least two satellite positioning antennas by the number of the at least two satellite positioning antennas.

12. The base station according to claim 7, wherein the processor is further configured to obtain an azimuth of the baseline according to the coordinates of the baseline in the LLS and to obtain an azimuth of the base station antenna according to the included angle and the azimuth of the baseline.

13. A method for acquiring information about a base station antenna of a base station through satellite positioning antennas, the method comprising:
    receiving, through at least two satellite positioning antennas, satellite signals sent by a satellite in a satellite positioning system, wherein a baseline formed by a connecting line between two of the at least two satellite positioning antennas and a normal of the base station antenna have an included angle;
    obtaining carrier phase information, carrier wavelength information and satellite ephemeris information of the satellite signals by parsing the satellite signals;
    obtaining two wave paths from the satellite to the two of the at least two satellite positioning antennas according to the carrier phase information and the carrier wavelength information;
    obtaining a wave path difference between the two wave paths;
    obtaining coordinates of the satellite in a World Geodetic System (WGS) according to the satellite ephemeris information;
    obtaining coordinates of the baseline in the WGS according to the two wave paths, the wave path difference and the coordinates of the satellite in the WGS;
    converting the coordinates of the baseline in the WGS to coordinates in a local level system (LLS);
    obtaining a pitch angle of the baseline according to the coordinates of the baseline in the LLS; and
    obtaining a downtilt of the base station antenna according to the pitch angle of the baseline and the included angle.

14. The method according to claim 13, wherein the method further comprises:
    obtaining longitude and latitude information of the at least two satellite positioning antennas by parsing the satellite signals;
    obtaining a longitude of the base station antenna by dividing a longitude sum of the at least two satellite positioning antennas by the number of the at least two satellite positioning antennas; and
    obtaining a latitude of the base station antenna by dividing a latitude sum of the at least two satellite positioning antennas by the number of the at least two satellite positioning antennas.

15. The method according to claim 13, wherein the satellite positioning system is a Global Positioning System (GPS).

16. The method according to claim 13, wherein the method further comprises:
    obtaining an azimuth of the baseline according to the coordinates of the baseline in the LLS; and
    obtaining an azimuth of the base station antenna according to the included angle and the azimuth of the baseline.

17. The method according to claim 13, wherein the at least two satellite positioning antennas locate in an upper part of the base station antenna.

18. The method according to claim 17, wherein the method further comprises:
    obtaining height information of the at least two satellite positioning antennas by parsing the satellite signals; and
    obtaining a mounting height of the base station antenna on the base station by dividing a height sum of the at least two satellite positioning antennas by the number of the at least two satellite positioning antennas.

* * * * *